United States Patent [19]

Nass et al.

[11] Patent Number: 5,484,467
[45] Date of Patent: Jan. 16, 1996

[54] PROCESS FOR THE PRODUCTION OF DECORATIVE GLASS CERAMIC ARTICLES

[75] Inventors: Peter Nass, Mainz; Otmar Becker, Langen; Klaus Kristen, Wiesbaden; Waldemar Weinberg, Seibersbach; Manfred Borens; Roland Leroux, both of Stadecken-Elsheim; Jürgen Thürk, Schornsheim, all of Germany

[73] Assignee: Schott Glaswerke, Mainz, Germany

[21] Appl. No.: 106,755

[22] Filed: Aug. 16, 1993

[30] Foreign Application Priority Data

Aug. 14, 1992 [DE] Germany ............... 42 26 946.6

[51] Int. Cl.$^6$ ............ C03B 32/02; C03C 17/00; C03C 3/085
[52] U.S. Cl. ............ 65/33.4; 65/60.1; 65/102; 65/111; 427/540; 427/372.2; 428/67; 501/69
[58] Field of Search ............ 65/33, 30.1, 31, 65/61, 102.103, 60.5, 60.53, 105, 111, 112, 60.1, 33.4; 427/307, 309, 376.2, 372.2, 376.3, 383.5, 540; 428/67; 156/663; 250/324; 501/55, 68, 69

[56] References Cited

U.S. PATENT DOCUMENTS

| | | | |
|---|---|---|---|
| 3,775,154 | 11/1973 | Grego et al. | 65/33 |
| 3,785,792 | 1/1974 | Plumat | 65/33 |
| 3,816,161 | 6/1974 | Buckley | 65/33 |
| 4,277,522 | 7/1981 | Dorfeld | 65/61 |
| 5,212,122 | 5/1993 | Pannhorst et al. | 501/69 |
| 5,269,826 | 12/1993 | Leroux et al. | 65/33 |

FOREIGN PATENT DOCUMENTS

| | | |
|---|---|---|
| 1270658 | 6/1990 | Canada. |
| 0220333 | 5/1987 | European Pat. Off.. |
| 4115500 | 11/1992 | Germany. |

OTHER PUBLICATIONS

Kingery et al, "Introduction to Ceramics, Second Edition", 1976, pp. 92–93.
Askeland, D. R., "The science and Engineering of Materials", 1984, pp. 474–475.
*Schott Guide to Glass*, p. 108 (1983).
British Patent Application No. 9209873.0, filed May 7, 1992.
Cover page of EP 0 220 333, published Mar. 21, 1990.

*Primary Examiner*—David L. Lacey
*Assistant Examiner*—Steven P. Griffin
*Attorney, Agent, or Firm*—Millen, White, Zelano, & Branigan

[57] ABSTRACT

Process for the production of decorative glass ceramic articles, the design being sunk entirely or partially into the surface of the glass ceramic, wherein the surface, to be decorated, of the not-yet ceramed base glass is connected as the anode of the region of its glass transition temperature Tg up to Tg+100° C. and a current is allowed to flow evoking an alteration of the surface of the base glass, and wherein the current is permitted to flow until the surface has been altered to a desired depth.

14 Claims, 2 Drawing Sheets

PROCESS FOR THE PRODUCTION OF DECORATIVE GLASS CERAMIC ARTICLES

SUMMARY OF THE INVENTION

The invention relates to a process for the production of decorative glass-ceramic articles, especially decorative stove tops, wherein the design is sunk into the surface of the glass ceramic entirely or partially, and wherein burning-in of the decorating paint takes place simultaneously with the ceraming step. The invention also relates to decorative glass-ceramic articles produced according to this process.

Glass-ceramic articles have found increasing usage, for example, as cookware which is resistant to temperature fluctuations, i.e., highly thermally stable cookware, as see-through windows for stoves and see-through fireside panels, as fire protection glazings and/or facade panels and, in particular, also as cooking surfaces or stove tops.

All of these articles are generally provided with decorations. The decorating of glass-ceramic articles is effected, on the one hand, for aesthetic reasons, for example, in order to cover underlying electronic components or range door gaskets, but, on the other hand, also for technical reasons, for example, in order to mark cooking areas in the case of stove tops, or also in order to apply conductor paths to the glass-ceramic.

Depending on the particular usage, the decorating materials employed are, for example, ceramic paints on enamel basis, metallic, metal-containing and/or salt-containing blends and/or glass compositions or combinations with one another. An example of a suitable decorating material is as follows:

| | |
|---|---|
| $Al_2O_3$ | 3–3.5% m/m |
| $B_2O_3$ | 4–4.5% m/m |
| CaO | 0–0.2% m/m |
| CoO | 1.5–2.5% m/m |
| $Cr_2O_3$ | 4–4.5% m/m |
| $Fe_2O_3$ | 0.4–0.9% m/m |
| $K_2O$ | 0.6–0.9% m/m |
| MgO | 0.1–0.2% m/m |
| $Na_2O$ | 3–3.5% m/m |
| PbO | 50–55% m/m |
| $Sb_2O_3$ | 4–4.5% m/m |
| $SiO_2$ | 23–25% m/m |
| $SnO_2$ | 1–1.5% m/m |
| ZnO | 1–1.5% m/m |

The decorations or designs are applied according to conventional techniques, such as, for example, by screen printing or transfer printing, and are then baked in. See, e.g., *Schott Guide to Glass*, p. 108 (1983). As is known, glass-ceramics are produced from a base glass that can be made into a glass-ceramic according to a precisely predetermined temperature-time program, wherein temperatures can reach up to about 1100° C. This process is also called ceraming.

In order to save energy and additional working steps during manufacturing, the burning-in of the designs is customarily performed with the ceraming step although the ceraming temperatures are at a very high level as compared with the usual temperatures utilized for burning-in decorative paints.

Heretofore, all designs have the feature in common that they are located on the surface of the glass-ceramic in a more or less elevated fashion and thereby constitute a pronounced relief structure, for example, as a spotwise grid or as linear markings.

These raised designs, however, frequently also represent a disadvantage particularly for practical use over prolonged periods of time. Not all paints are usable since some of them are relatively sensitive to abrasion and erosion, for example, during upkeep, daily cleaning, or also merely during use of the cooking surfaces.

Dirt, especially, can accumulate with particular preference on and between the raised decorative areas, and any measure taken to remove the frequently obstinate contaminations and possibly even baked-in deposits will endanger, in the final analysis, the decorative area proper about which these contaminations have accumulated.

As a result, there is a limited choice of design materials fulfilling these conditions of adhesion and, respectively, abrasion resistance, i.e., many designs which would satisfy all other conditions except for these criteria of abrasion resistance and adhesion have not been usable heretofore as decorations.

Moreover, decorations which exhibit vigorous, eye-appealing colors only when a relatively thick layer must be excluded since decorations applied with excessive thickness, for example, will additionally invite and promote dirt encrustations, and will make cleaning considerably further difficult. Such decorations will detach themselves with even greater ease on account of the markedly different thermal longitudinal expansion between the design and the glass-ceramic substrate and, in the final analysis, when used as cooking surfaces, will also impair heat transfer between plate and cookware.

Furthermore, decorations applied in too thick a layer tend to "run" on the smooth raw glass or glass-ceramic surface, and ill-defined, blurred marginal contours are produced, and/or the individual decorative points, lines, or areas merge into one another.

In order to avoid the aforedescribed disadvantages, DE 36 00 109-A1 (see also CA 1,270,658) suggests a cooking surface of glass-ceramic or a comparable material wherein the topside has a structure such that specific surface areas are raised relatively to their surroundings by at least 0.01 mm wherein, for example, in the case of a decorative cooking surface, the elevations can be devoid of decorative paints.

Although this is a possible beginning for a solution of protecting poorly adhesive or abrasion-prone designs at non-elevated zones of the surface, the surface requires very expensive production methods and very complicated matrix roll geometries, for example, in the production of flat, plate-shaped glass-ceramic articles.

Chemical and/or electrochemical methods have likewise been described for suitably modifying surfaces above and beyond purely physical measures in order to adapt a glass surface to specific requirements.

Thus, a process has been disclosed in German patent application P 41 15 500.9 for production of decorative glass-ceramic articles wherein an article of crystallizable glass is decorated with a ceramic paint and then converted into a glass-ceramic article by a heat treatment and simultaneous burning-in of the ceramic paint, wherein the glass article, prior to decorating, is treated with a Brönsted acid at temperatures of between 50° C. and 800° C. for 10 minutes to 50 hours.

The object (of P 41 15 500.9) is to propose a method wherein the design can be applied in a larger thickness and wherein the decoration lies essentially in one plane with the undecorated portions of the class ceramic article.

It is an object of the present invention to provide a process avoiding the drawbacks of the state of the art and making it possible to produce, with low production costs, decorative glass-ceramic components wherein the design is not only seated on the surface of the basic glass and/or glass-ceramic but wherein the design, depending on the conductance of the process, sinks into the glass-ceramic to such an extent that glass-ceramic and design constitute one plane, or wherein the design sinks in partially but remains a relief-forming item, or sinks in even to such a degree that it lies below the level of the glass-ceramic, and according to which process the design can also be applied in relatively large thicknesses.

Furthermore, it is an object of the present invention to make available a decorated glass-ceramic produced in accordance with the process of the present invention.

Upon further study of the specification and appended claims, further objects and advantages of this invention will become apparent to those skilled in the art.

These objects are attained according to the invention by a process wherein the surface of the not yet ceramed base glass, prior to being decorated, is connected to the anode of a voltage source at a temperature of preferably about the glass transition temperature of the base glass, Tg, up to about Tg+100° C., especially about Tg –Tg+50° C., and a current is established between the cathode and the anode of the voltage source evoking a change in the surface of the base glass, wherein the flow of current is maintained until the surface has been altered down to a desired depth.

In a preferred embodiment, the surface of the base glass is altered to a depth of preferably about 0.5–9 µm since, on the one hand, the process can, in this way, be performed in a very economical fashion and, on the other hand, an adequate sinking-in depth of the design into the base glass is ensured in any event. An especially preferred range for the depth of alteration is 0.5–4 µm.

It is believed that the alteration of the surface of the base glass is characterized by an inducement of ion migration, thereby permitting the decoration to sink into the glass surface during ceramization. Depending on the intended usage, it is desirable to allow the design to sink completely into the base glass layer in order to thereby obtain a planar decorated glass-ceramic plate, the designs of which lie within the glass-ceramic plate, protected from abrasion and erosion.

The following substantial advantages can be cited for these aspects:

it is no longer possible for contaminations to settle on raised designs;

the planar decorative glass-ceramic offers no problems with regard to cleaning;

no abrasion or detachment of the design;

the use of decorations which, according to the state of the art, exhibit insufficient adhesive strengths or abrasion resistances is possible;

thicker design layers can be used so that it is possible to employ color decorations which yield vigorous, eye-catching color hues only in thicker layers;

the designs show sharply delineated contours and do not run into one another.

However, it is also possible according to the process of this invention to have the decoration sink partially into the substrate to such an extent that it is bonded into the glass-ceramic up to a definite layer thickness, but yet remains a raised design and exhibits elevations.

On account of such a structuring of the surface, cooking surfaces which, for example, show only a sparse decorative pattern become, from the aesthetic impression, less sensitive to scratches and slight contamination, for example, by fingerprints, since these phenomena will be much less noticeable on a textured surface than on a planar, smooth surface.

Articles which come in contact with a plate decorated in this manner according to the invention will contact only the elevations and lead, if at all, to abrasion only at those locations while the remaining regions will stay unaffected. Also, if abrasion of the design should indeed progress to such an extent that erosion has proceeded down to the level of the glass-ceramic, there will still remain, according to the invention, always a decorative and functional glass-ceramic since a portion of the decoration persists, safe from abrasion and erosion, bound into the glass-ceramic surface.

However, the invention also offers the possibility of having the design sink below the level of the plane of the glass-ceramic which possibly causes certain desirable aesthetic effects, for example, in the case of translucent and/or transilluminated glass-ceramics, or, alternatively, leads to an, in part, substantial increase in the specific surface area of such a component.

Such an increase in the specific surface area by a controlled lowering of specific surface regions is, for example, advantageous in order to obtain protected zones located at a different angle with respect to a stress direction, which can keep these protected zones, for example, free of contaminations.

Likewise, it is, of course, possible according to the invention with a small additional expenditure to realize all of the aforedescribed versions of design formation, for example, also on a single glass-ceramic plate.

According to the process of this invention, the surface of the base glass is varied down to a depth which corresponds to the layer thickness of the decoration, or which is less than the layer thickness of the decoration, or which is greater than the layer thickness of the decoration.

In this connection, it is also possible to provide locally differing design formations on a glass-ceramic component by locally differently long treatment, e.g., maintaining the current for different time periods at different locations, or by texturized coating, e.g., using different thickness of decorating materials at different locations.

The base glass is depleted, according to this invention, supposedly particularly in lithium ions by an electrical field having a current flow of preferably about 0.5–10 mA/cm$^2$ with a voltage range of preferably about 10–200 V, since it has been found that only a predominant absence of lithium ions makes it possible at all to obtain the effect of sinking-in of the glazing during the ceraming of the glass.

The depth of the altered surface layer can be adjusted by the duration of the treatment. Customarily, depths are obtained of preferably about 0.5–9 µm according to this invention in treatment periods of preferably about 30 seconds–6 minutes. Treatment duration will depend on, for example, desired depth of alteration, flow of current, voltage level, and glass composition.

It is believed that with a predominant absence of lithium ions in the base glass, during ceramic generation, a crystallization of, for example, β-spodumene LiAl $(Si_2O_6)$ and/or β-eucryptite LiAl $(SiO_4)$ occurs only with a delay or is entirely precluded and thereby viscosity conditions are created in the surface area of the glass which is depleted of lithium ions which permit sinking-in of the glazing very precisely to the depth at which crystallization does not take place or occurs only with a delay. The absence of magnesium ions may also contribute to the desired sinking-in effect.

The electrical field and/or the current acts on the base glass by means of electrodes and/or by way of a coating of a conductive material, e.g., gold, platinum, chromium, copper, or similar materials.

The conductive coating can be removed again with relative ease by wiping after the treatment.

However, the use of "soft" electrodes is likewise feasible, such as, for example, a graphite mat which adapts, with application of corresponding contact pressure, to the surface of the base glass component to be treated. However, the graphite electrodes should be utilized in an inert atmosphere, for example, nitrogen or argon, at elevated temperatures on account of the danger of oxidation.

In a preferred embodiment, the present invention employs corona discharges as an electrode for the application of the electric field. This procedure does not exhibit most of the disadvantages of the conventional methods cited above.

When performing the corona discharge, for example, at a low vacuum, many types of gases can be employed for building of the corona contacts, and high current densities are obtained at applied voltages of preferably about 1–10 kV, especially 5–10 kV. The corona discharge is preferably carried out under pressures of about 13.3 Pa–3×10$^{-5}$ Pa. However, corona contacts can also be built up under normal atmospheric pressure. In this connection, a fine wire mesh or a multi-point arrangement is preferred as the anode as well as the cathode.

According to the invention, the electric field preferably still acts on the base glass even during the cooling phase.

In this process embodiment, the electrical field is effective in the region of the glass transition temperature Tg up to Tg+100° C. until an alteration of the surface has been obtained to the desired depth. This time period is decisively dependent on the glass composition and can be determined for each individual case by routine preliminary tests. The electrical field is preferably maintained until the base glass has been cooled to Tg–100° C.

Basically, the process according to the present invention can be utilized with success in all glass compositions that can be made into a ceramic. However, the procedure of this invention has proven itself especially well in base glass compositions for glass ceramics as known from EP 0 220 333-B1 (see also U.S. Pat. No. 5,212,122) with: $SiO_2$ 62–68; $Al_2O_3$ 19.5–22.5; $Li_2O$ 3.0–4.0; $Na_2O$ 0–1.0; $K_2O$ 0–1.0; BaO 1.5–3.5; CaO 0–1.0; MgO 0–0.5; ZnO 0.5–2.5; $TiO_2$ 1.5–5.0; $ZrO_2$ 0–3.0; $MnO_2$ 0–0.40; $Fe_2O_3$ 0–0.20; CoO 0–0.30; NiO 0–0.30; $V_2O_5$ 0–0.80; $Cr_2O_3$ 0–0.20; F 0–0.20; $Sb_2O_3$ 0–2.0; $As_2O_3$ 0–2.0; $\Sigma Na_2O+K_2O$ 0.5–1.5; $\Sigma BaO+CaO$ 1.5–4.0; $\Sigma TiO_{2\ +ZrO2}$ 3.5–5.5; $\Sigma Sb_2O_{3\ +As2}O_3$ 0.5-2.5 (all data in percent by weight.)

These glasses also respond especially quickly to an electrical field acting thereon.

According to the invention, the process is performed preferably under atmospheric pressure in normal ambient air. However, the process can also be conducted under a vacuum of preferably about 13.3–3 ×10$^{-5}$ Pa in an $SO_2$ atmosphere.

According to the present invention, the base glass herein can be decorated by a grid or can also be imprinted in linear fashion. Individual discrete grid points as well as flat or linear imprints will sink in the desired way into the surface layer of the glass during the ceraming step when performing the process.

In case of rapidly performed processes, with very different design formations on an article, but also in case of particularly high demands on the surface quality, it may be advantageous to impress the decoration into the surface layer of the glass, for example, by means of a roll in order to accelerate the sinking-in process and to make it more uniform.

The invention also relates to a decorative glass-ceramic produced in accordance with this process.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
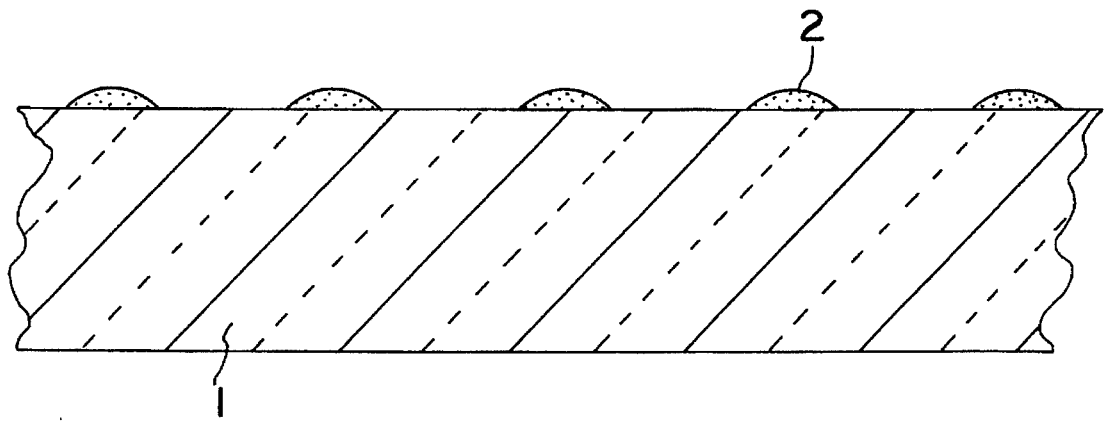
FIG. 1 shows a glass-ceramic article according to the state of the art with decorative points located on top of the glass-ceramic.

FIG. 1 illustrates a fragment of a glass plate 1 made of a crystallizable glass system $Li_2O$—$Al_2O_3$—$_{SiO2}$ having the composition (in weight percent) of $Al_2O_3$ 21.8; BaO 2.4; CoO 0.07; $Fe_2O_3$ 0.07; $Li_2O$ 3.45; $MnO_2$ 0.09; $Na_2O$ 0.75; NiO 0.08, $Sb_2O_3$ 1.5; $SiO_2$ 64.44; $TiO_2$ 2.3; $V_2O_5$ 0.25; ZnO 1.20; $ZrO_2$ 1.60, with the dimensions (mm) of 400×400×5.

The glass transition temperature Tg of this glass composition amounts to about 680° C.

The plate was decorated according to the screen printing method with a spotwise pattern 2 of ceramic paint. A commercially available paint, consisting of a suspension of a powder of coloring oxides and a lead borate glass as the binder, was utilized as the ceramic decoration. The paint is applied in such a thickness that it results in a layer thickness of the design of about 3.5 µm after ceraming of the base plate with simultaneous burning-in of the decorative paint at 900° C.

Figure 2:
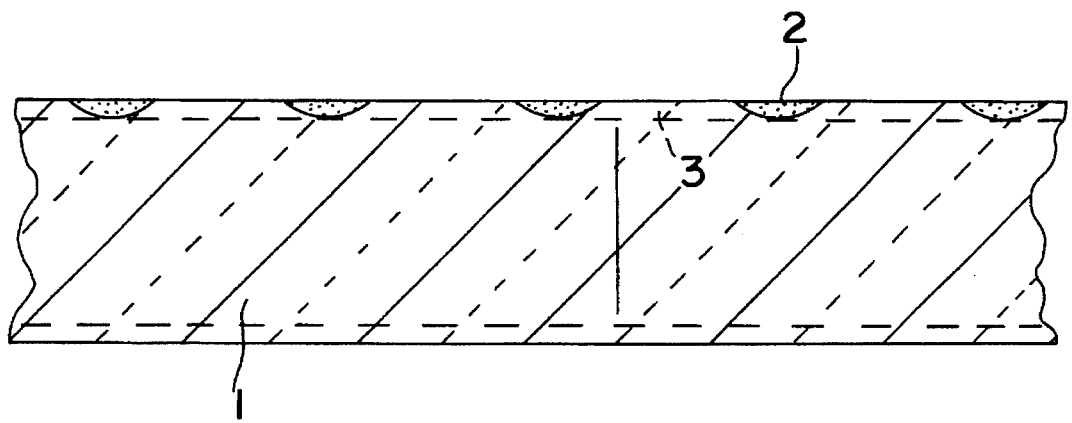
FIG. 2 shows a glass-ceramic article according to the present invention with a surface area pretreated in accordance with the process of the invention and with a completely sunk-in design.

FIG. 2 shows a comparative plate 1 of the same base glass and design composition but wherein the surface 3 of the plate has been altered in a manner according to this invention prior to ceraming to a depth of 3.5 µm.

For this purpose, the surface of the base glass plate was provided with a continuous conductive gold layer having a thickness of about 200 nm, heated to 680° C., and connected as the anode.

In this practical example, a current of 1 mA/cm$^2$ at a voltage of 15 V, was flowing for 3 minutes.

Thereafter, the plate was cooled, with a constant field, to room temperature.

The experiment was performed in a normal atmosphere under atmospheric pressure.

Thereafter, the gold layer was removed from the surface of the plate and the thus-pretreated base glass plate was decorated with ceramic paint and ceramed at 900° C.

It was found that the decoration 2, after this pretreatment of the base glass according to the invention, had sunk into the surface of the glass plate to precisely such an extent that the decorative points no longer protruded past the surface of the glass plate but rather constituted a continuous planar surface unit.

Figure 3A:
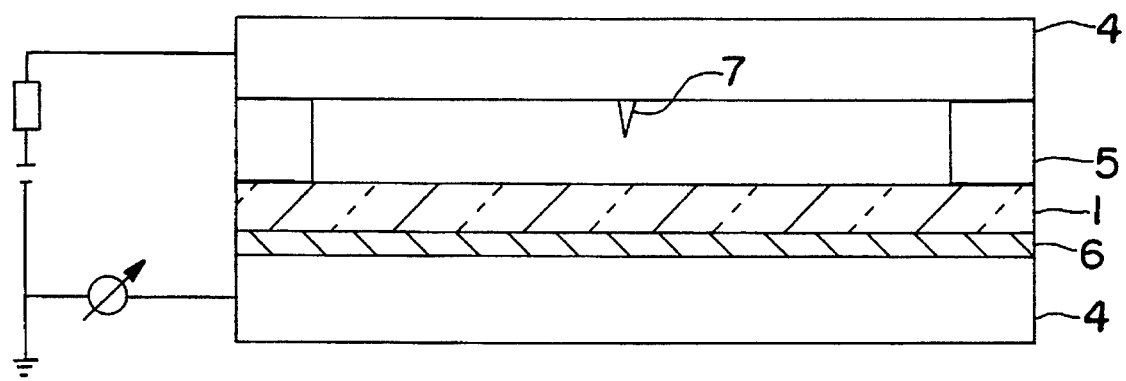
FIGS. 3a and 3b show arrangements for performing the process pursuant to the invention.

FIG. 3a shows schematically an arrangement for altering the base glass surface with the aid of a so-called corona discharge.

The glass-ceramic substrate 1 is located between two electrodes 4 and is held at a defined distance from the top electrode by nonconductive spacers 5. The contact to the discharge electrode can be established by a conductive medium 6, e.g., a graphite foil. Discharge takes place via the wire tip 7.

Values of 150–300 mC/cm$^2$ were found as characteristic limit values of the charges.

The arrangement is to be incorporated, for example, in a simple way into the course of the process of a glass-ceramic plate production.

A plasma produced by corona discharge acts at Tg+20° C. for 1 minute on the base glass plate connected as the anode, namely with an applied voltage of 5 kV and a power of 25 W.

The voltage is dependent on the pressure and the electrode spacing, the latter amounts, according to this invention, to preferably about 0.5 mm–15 mm. In the present example, the electrode spacing was, for example 6 mm.

Normal atmosphere was utilized as the discharge gas.

Thereafter, the plate is cooled from Tg+20° C. to Tg–80° C., in the present example, especially from 700° C. to 600° C.

An electrical field is maintained during this procedure.

Figure 3B:
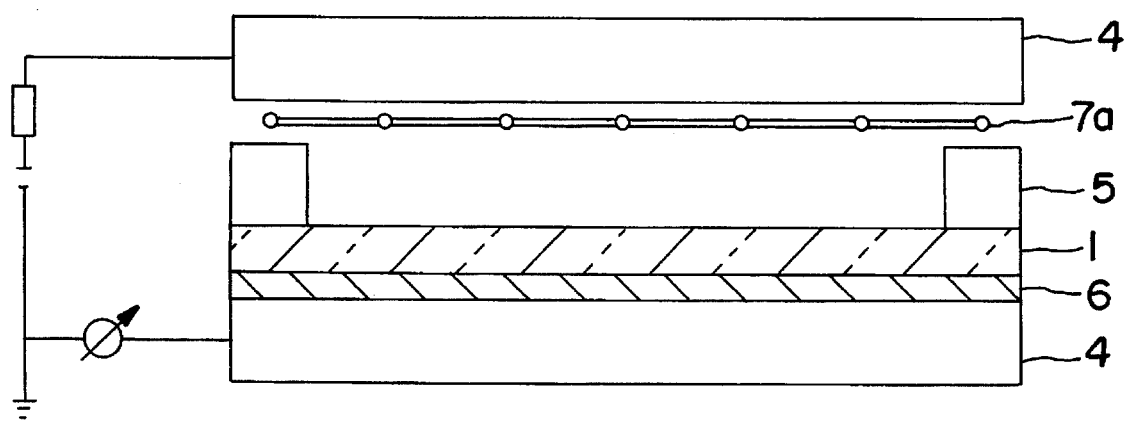

Analogously to FIG. 3a, the wire tip 7 shown in FIG. 3a can be replaced by a wire mesh with a plurality of tips (FIG. 3b, 7a). In this way, relatively large areas can be treated homogeneously.

After the treatment, the plate is decorated in the usual way and subsequently ceramed at temperatures of 800–900° C.

Without further elaboration, it is believed that one skilled in the art can, using the preceding description, utilize the present invention to its fullest extent. The preferred specific embodiments are, therefore, to be construed as merely illustrative, and not limitative of the remainder of the disclosure in any way whatsoever.

In the foregoing, all temperatures are set forth uncorrected in degrees Celsius and unless otherwise indicated, all parts and percentages are by weight.

The entire disclosure of all applications, patents and publications, cited above, and of corresponding German application P 42 26 946.6, filed Aug. 14, 1992, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for production of a decorative glass-ceramic article comprising:

connecting a substrate surface to an anode of a voltage source, wherein said substrate is an unceramized glass substrate, and, while said glass substrate is at a temperature within the range of the glass transition temperature of said glass substrate up to and including 100° C. above said glass transition temperature, producing a current between said anode and a cathode of said voltage source and through said glass substrate whereby a sufficient depth of said surface of said glass substrate is altered to permit a decoration to sink entirely or partially into said surface;

applying a decoration to said surface; and ceramizing said glass substrate to obtain a decorated glass ceramic article wherein, during ceramization, said decoration sinks entirely or partially into said surface of said glass substrate and wherein burning-in of said decoration occurs simultaneously with said ceramization.

2. A process according to claim 1, wherein said glass substrate contains lithium ions.

3. A process according to claim 2, wherein said current is produced while said glass substrate is at a temperature within the range of said glass transition temperature of said glass substrate up to and including 50° C. above said glass transition temperature.

4. A process according to claim 3, wherein said surface of said glass substrate is altered to a depth of 0.5–9 μm.

5. A process according to claim 4, wherein said current produced between said anode and said cathode is 0.5–10 mA/cm$^2$ at a voltage of 10 V–200 V.

6. A process according to claim 4, wherein said glass substrate is altered to a depth of 0.5–4 μm.

7. A process according to claim 3, wherein said current produced between said anode and said cathode is 0.5–10 mA/cm$^2$ at a voltage of 10 V–200 V.

8. A process according to claim 2, wherein said surface of said glass substrate is altered to a depth of 0.5–9 μm.

9. A process according to claim 8, wherein said current produced between said anode and said cathode 0.5–10 mA/cm$^2$ at a voltage of 10 V–200 V.

10. A process according to claim 2, wherein said current produced between said anode and said cathode 0.5–10 mA/cm$^2$ at a voltage of 10 V–200 V.

11. A process according to claim 10, wherein said current is applied to said glass substrate by means of electrodes and/or by way of a coating of a conductive material.

12. A process according to claim 2, wherein said current is applied as a corona discharge with an applied voltage of 1–10 kV.

13. A process according to claim 2, wherein said decorated glass ceramic article is a stove top.

14. A process according to claim 2, wherein the composition of said glass substrate is:

|  | Wt. % |
| --- | --- |
| $SiO_2$ | 62–68 |
| $Al_2O_3$ | 19.5–22.5 |
| $Li_2O$ | 3.0–4.0 |
| $Na_2O$ | 0–1.0 |
| $K_2O$ | 0–1.0 |
| BaO | 1.5–3.5 |
| CaO | 0–1.0 |
| MgO | 0–0.5 |
| ZnO | 0.5–2.5 |
| $TiO_2$ | 1.5–5.0 |
| $ZrO_2$ | 0–3.0 |
| $MnO_2$ | 0–0.40 |
| $Fe_2O_3$ | 0–0.20 |
| CoO | 0–0.30 |
| NiO | 0–0.30 |
| $V_2O_5$ | 0–0.80 |
| $Cr_2O_3$ | 0–0.20 |
| F | 0–0.20 |
| $Sb_2O_3$ | 0–2.0 |
| $As_2O_3$ | 0–2.0 |
| $\Sigma\ Na_2O + K_2O$ | 0.5–1.5 |
| $\Sigma\ BaO + CaO$ | 1.5–4.0 |
| $\Sigma\ TiO_2 + ZrO_2$ | 3.5–5.5 |
| $\Sigma\ Sb_2O_3 + As_2O_3$ | 0.5–2.5. |

\* \* \* \* \*